(12) United States Patent (10) Patent No.: US 12,013,014 B2
Nagumo (45) Date of Patent: Jun. 18, 2024

(54) FRICTION TRANSMISSION DEVICE

(71) Applicant: SUMITOMO HEAVY INDUSTRIES, LTD., Tokyo (JP)

(72) Inventor: Toshiya Nagumo, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/931,115

(22) Filed: Sep. 9, 2022

(65) Prior Publication Data

US 2023/0003284 A1 Jan. 5, 2023

Related U.S. Application Data

(63) Continuation of application No. PCT/JP2021/005066, filed on Feb. 10, 2021.

(30) Foreign Application Priority Data

Mar. 12, 2020 (JP) ................................. 2020-043419

(51) Int. Cl.
*F16H 15/50* (2006.01)
*F16H 13/08* (2006.01)
*F16H 57/08* (2006.01)

(52) U.S. Cl.
CPC .............. *F16H 13/08* (2013.01); *F16H 57/08* (2013.01); *F16H 15/50* (2013.01); *F16H 2057/085* (2013.01)

(58) Field of Classification Search
CPC .......... F16H 13/08; F16H 15/50; F16H 15/48; F16H 15/52
See application file for complete search history.

(56) References Cited

U.S. PATENT DOCUMENTS

| 1,112,711 | A | * | 10/1914 | Martins | F16H 15/52 |
| | | | | | 475/185 |
| 1,691,625 | A | * | 11/1928 | Chilton | F16H 61/6647 |
| | | | | | 475/195 |
| 1,995,689 | A | * | 3/1935 | Shively | F16H 15/48 |
| | | | | | 475/195 |
| 3,299,743 | A | * | 1/1967 | Stockton | F16H 37/084 |
| | | | | | 475/47 |

(Continued)

FOREIGN PATENT DOCUMENTS

| GB | 912626 A | * 12/1962 |
| JP | 39-6259 B1 | 5/1964 |
| JP | 2015-232402 A | 12/2015 |

OTHER PUBLICATIONS

PCT International Search Report of PCT/JP2021/005066 mailed Apr. 27, 2021 by Japan Patent Office.

*Primary Examiner* — Sherry L Estremsky
(74) *Attorney, Agent, or Firm* — WTA Patents

(57) ABSTRACT

Provided is a friction transmission device including an input raceway ring, a planetary rolling element that is disposed around a rotation axis of the input raceway ring and comes into contact with the input raceway ring; an output raceway ring that comes into contact with the planetary rolling element and is connected to an output shaft, and a first support raceway ring and a second support raceway ring that come into contact with the planetary rolling element. A quadrangle is formed by extension lines of normal vectors at contact points between the planetary rolling element and the respective raceway rings.

16 Claims, 12 Drawing Sheets

(56) References Cited

U.S. PATENT DOCUMENTS

| | | | |
|---|---|---|---|
| 6,461,268 B1 * | 10/2002 | Milner | F16H 15/50 475/183 |
| 8,512,195 B2 | 8/2013 | Lohr et al. | |
| 8,721,485 B2 | 5/2014 | Lohr et al. | |
| 9,360,089 B2 | 6/2016 | Lohr et al. | |
| 10,066,712 B2 | 9/2018 | Lohr et al. | |
| 2011/0218072 A1 | 9/2011 | Lohr et al. | |
| 2013/0331218 A1 | 12/2013 | Lohr et al. | |
| 2014/0248988 A1 | 9/2014 | Lohr et al. | |
| 2016/0281825 A1 | 9/2016 | Lohr et al. | |
| 2018/0372192 A1 | 12/2018 | Lohr et al. | |

* cited by examiner

FRICTION TRANSMISSION DEVICE

CROSS-REFERENCE TO RELATED APPLICATIONS

This is a bypass continuation of International PCT application number PCT/JP2021/005066 filed on Feb. 10, 2021, which claims priority to Japanese Patent Application No. 2020-043419 filed on Mar. 12, 2020, which is incorporated by reference herein in their entirety.

BACKGROUND

Technical Field

Certain embodiments relate to a friction transmission device.

Description of Related Art

Continuously variable transmissions referred to as infinite variable transmissions (IVTs), which are capable of an infinite change gear ratio, have been known. For example, the related art discloses a transmission having a plurality of planetary assemblies disposed at an angle around an axis. The transmission includes a non-rotatable first traction ring in contact with the planetary assemblies, a second traction ring that transmits power in contact with the planetary assemblies, a first carrier member coupled to one end of an axial center of the planetary assemblies, a second carrier member coupled to the other end of the axial center of the planetary assemblies, and a shift control mechanism that adjusts the inclination angle of the planetary assemblies.

SUMMARY

According to an embodiment of the present invention, there is provided a friction transmission device including an input raceway ring; a planetary rolling element that is disposed around a rotation axis of the input raceway ring and comes into contact with the input raceway ring; an output raceway ring that comes into contact with the planetary rolling element and is connected to an output shaft; and a first support raceway ring and a second support raceway ring that come into contact with the planetary rolling element. A quadrangle is formed by extension lines of normal vectors at contact points between the planetary rolling element and the respective raceway rings.

In addition, any combinations of the above-described components and mutual substitutions of the components and expressions of the present invention between methods, systems, and the like are also effective as aspects of the present invention.

DETAILED DESCRIPTION

Figure 1:
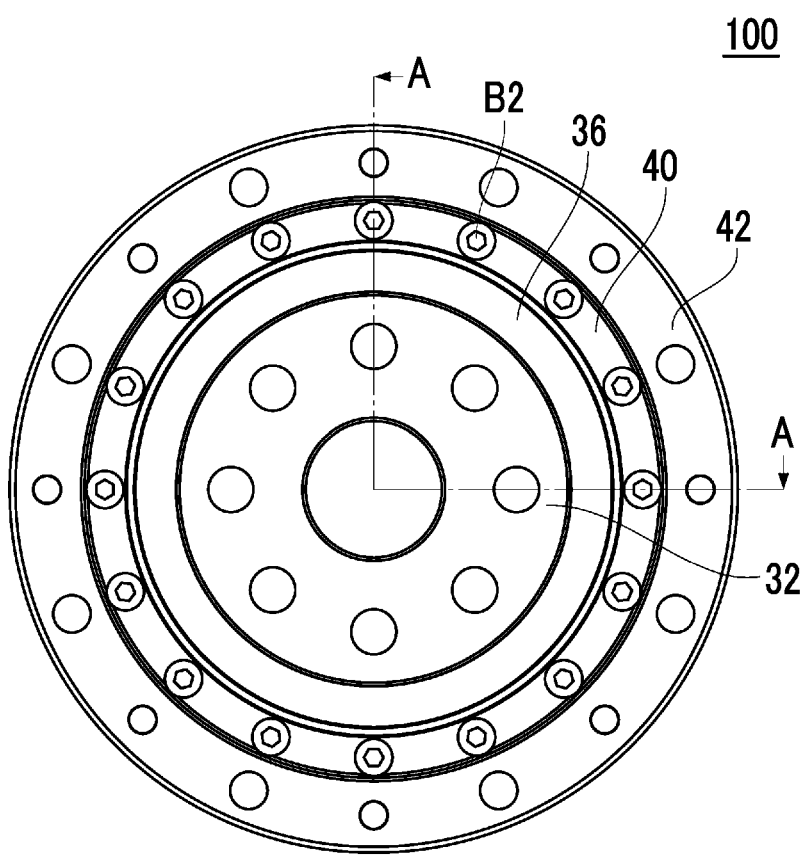
FIG. 1 is a front view schematically showing an example of a friction transmission device according to one embodiment.

The transmission is expected to be used in many applications such as robots and self-propelled bogies. In order for the transmission to be used in many applications, it is desirable to reduce the manufacturing costs. However, in the transmission described in the related art, it is difficult to reduce the manufacturing costs because a large number of members are complicatedly combined to support the rotation of the planetary assemblies.

The present invention has been made in view of such a circumstance, and the present invention is to provide a friction transmission device capable of reducing manufacturing costs.

According to the present invention, it is possible to provide the friction transmission device capable of reducing manufacturing costs.

Hereinafter, the present invention will be described with reference to the respective drawings on the basis of the preferred embodiments. In the embodiments and modification examples, the same or equivalent components and members will be designated by the same reference numerals, and redundant descriptions will be omitted as appropriate. Additionally, the dimensions of the members in the respective drawings are appropriately shown in an enlarged or reduced manner for easy understanding. Additionally, in the respective drawings, some of the members that are not important for explaining the embodiments will be omitted.

Additionally, terms including ordinal numbers, such as first and second, are used to describe various components. However, the terms are used only for the purpose of distinguishing one component from another component, and the components are not limited by the terms.

One Embodiment

The configuration of a friction transmission device 100 according to one embodiment of the present disclosure will be described with reference to FIG. 1. FIG. 1 is a front view schematically showing an example of the friction transmission device 100 according to the present embodiment. FIG.

2 is a sectional view schematically showing the friction transmission device 100. This figure shows a section along line A-A of FIG. 1.

The friction transmission device 100 is configured to cause the planetary rolling elements to rotate and revolve by rotating an input raceway ring and output the generated rotational component from the output shaft connected to an output raceway ring to a driven device (not shown).

The friction transmission device 100 mainly includes a transmission mechanism 10, a relative position change mechanism 60, and a coupling 70. The transmission mechanism 10 is a mechanism that changes the speed of the rotation input from the motor 50 and transmits the speed-changed rotation to the coupling 70. The relative position change mechanism 60 is a mechanism that changes the relative positions of the raceway rings of the transmission mechanism 10. The coupling 70 is a mechanism that absorbs the positional deviation between the output raceway ring and the output shaft of the transmission mechanism 10.

Transmission Mechanism

The transmission mechanism 10 will be described. The transmission mechanism 10 mainly includes an input shaft 12, an input raceway ring 14, an input shaft bearing 18, a planetary rolling element 20, a first support raceway ring 26, a second support raceway ring 28, an output raceway ring 30, an output shaft 32, a main bearing 34, an oil seal 36, and first and second casings 40 and 42. Hereinafter, a direction along a center axis La of the input shaft 12 is referred to as an "axial direction", and a circumferential direction and a radial direction of a circle centered on the center axis La are referred to as a "circumferential direction" and a "radial direction", respectively. Additionally, hereinafter, for convenience, one side in the axial direction (right side in the figure) is referred to as an input side, and the other side (left side in the figure) is referred to as a counter-input side. The input raceway ring 14, the first support raceway ring 26, the second support raceway ring 28, and the output raceway ring 30 may be simply referred to as a raceway ring, and the planetary rolling element 20 may be simply referred to as a rolling element.

When the rotation of the motor 50 is input, the input shaft 12 rotates around the center axis La. The input shaft 12 of the present embodiment is a cylindrical member that extends in the axial direction. The input raceway ring 14 is fixed to an outer periphery of the input shaft 12, and the input raceway ring and input shaft rotate integrally. A counter-input side of the input shaft 12 is connected to an inner ring of the input shaft bearing 18. An outer ring of the input shaft bearing 18 supports the first support raceway ring 26. The input shaft 12 is surrounded by the first support raceway ring 26 via a clearance. The input shaft 12 and the first support raceway ring 26 are disposed as to be relatively rotatable.

An end portion of the input shaft 12 on the input side is connected to the relative position change mechanism 60. The input shaft 12 is moved in the axial direction by driving the relative position change mechanism 60. An outer peripheral portion of the input shaft 12 on the input side is surrounded by a rotor 52 of the motor 50. The input shaft 12 is supported by the rotor 52 so as to be movable in the axial direction. A spline groove 12s provided on an outer peripheral surface of the input shaft 12 and a spline groove 51s provided on an inner peripheral surface of the rotor 52 mesh with each other through a clearance.

The input raceway ring 14 rotates around the center axis La as a rotation axis integrally with the input shaft 12. The input raceway ring 14 comes into contact with the planetary rolling element 20 and causes the planetary rolling element 20 to rotate and revolve as the input raceway ring 14 rotates. The input raceway ring 14 may be formed separately from the input shaft 12, but in this example, the input raceway ring 14 is formed integrally with the input shaft 12. The input raceway ring 14 is a substantially disc-shaped member and has a rolling contact surface 14h on the counter-input side. The rolling contact surface 14h is a surface on which the planetary rolling element 20 rolls, and substantially comes into point contact with the planetary rolling element 20. The rolling contact surface 14h is inclined with respect to the axial direction and the radial direction. The rolling contact surface 14h includes a tapered surface of which the diameter is reduced toward the counter-input side. The rolling contact surface 14h may be a curved surface such as a protruding surface or a recessed surface, but in this example, the rolling contact surface 14h is a flat surface.

The input shaft bearing 18 is provided between an end portion of the input shaft 12 on the counter-input side and the first support raceway ring 26. Although the type of bearing is not limited, the input shaft bearing 18 of the present embodiment is a rolling bearing having a spherical rolling element. The input shaft bearing 18 has an inner ring attached to the input shaft 12 and an outer ring fixed to the first support raceway ring 26.

The first support raceway ring 26 and the second support raceway ring 28 hold the posture and position of the planetary rolling element 20 within a certain range. The first support raceway ring 26 and the second support raceway ring 28 are separated from each other with the planetary rolling element 20 interposed therebetween and are disposed to face each other. The first support raceway ring 26 is disposed on a radially inner side on the counter-input side of the second support raceway ring 28.

The first support raceway ring 26 has a ring shape that surrounds the input shaft 12 via a clearance. The first support raceway ring 26 has a rolling contact surface 26h on the input side. The rolling contact surface 26h is a surface on which the planetary rolling element 20 rolls, and substantially comes into point contact with the planetary rolling element 20. The rolling contact surface 26h is inclined with respect to the axial direction and the radial direction. The rolling contact surface 26h includes a tapered surface of which the diameter is reduced toward the input side. The rolling contact surface 26h may be a curved surface such as a protruding surface or a recessed surface, but in this example, the rolling contact surface 26h is a flat surface. The first support raceway ring 26 is freely rotatable with respect to the input shaft 12 and the planetary rolling element 20 and may be referred to as an idle raceway ring.

The second support raceway ring 28 has a ring shape that surrounds the input shaft 12 and the planetary rolling element 20. The second support raceway ring 28 has a rolling contact surface 28h on the counter-input side. The rolling contact surface 28h is a surface on which the planetary rolling element 20 rolls, and substantially comes into point contact with the planetary rolling element 20. The rolling contact surface 28h is inclined with respect to the axial direction and the radial direction. The rolling contact surface 28h includes a tapered surface of which the diameter is reduced toward the input side. The rolling contact surface 28h may be a curved surface such as a protruding surface or a recessed surface, but in this example, the rolling contact surface 28h is a flat surface. The rolling contact surface 28h of the second support raceway ring 28 substantially faces the rolling contact surface 26h of the first support raceway ring 26 with the planetary rolling element 20 interposed therebetween.

The second support raceway ring 28 is fixed to an inner peripheral side of the second casing 42. The second support raceway ring 28 may be formed separately from the second casing 42, but in this example, the second support raceway ring 28 is formed integrally with the second casing 42.

The output raceway ring 30 comes into contact with the planetary rolling element 20 and rotates around the center axis La as the planetary rolling element 20 rotates. The output raceway ring 30 is connected to the output shaft 32 via the coupling 70, and the coupling 70 and the output shaft 32 rotate as the output raceway ring 30 rotates.

The output raceway ring 30 has a ring shape that surrounds the input shaft 12 and the planetary rolling element 20. The output raceway ring 30 has a rolling contact surface 30h on the input side. The rolling contact surface 30h is a surface on which the planetary rolling element 20 rolls, and substantially comes into point contact with the planetary rolling element 20. The rolling contact surface 30h is inclined with respect to the axial direction and the radial direction. The rolling contact surface 30h includes a tapered surface of which the diameter is reduced toward the counter-input side. The rolling contact surface 30h may be a curved surface such as a protruding surface or a recessed surface, but in this example, the rolling contact surface 30h is a flat surface. The rolling contact surface 30h of the output raceway ring 30 substantially faces the rolling contact surface 14h of the input raceway ring 14 with the planetary rolling element 20 interposed therebetween.

A plurality (for example, 6) of the planetary rolling elements 20 are disposed at predetermined intervals in the circumferential direction. A retainer may be provided to hold the plurality of planetary rolling elements 20 at desired positions, but in the present embodiment, the retainer is not provided. A configuration with no retainer is advantageous in terms of manufacturing cost, device size, device mass, and the like. In addition, the number of planetary rolling elements 20 is not particularly limited and may be less than or more than 6, but 6 to 12 planetary rolling elements are preferable.

Hereinafter, when the rolling contact surface 30h of the output raceway ring 30, the rolling contact surface 14h of the input raceway ring 14, the rolling contact surface 26h of the first support raceway ring 26, and the rolling contact surface 28h of the second support raceway ring 28 are collectively referred to, these may be referred to simply as a "rolling contact surface".

The planetary rolling element 20 is restricted in axial position, radial position and posture by coming into contact with the four rolling contact surface. The shape of the planetary rolling element 20 may be any shape as long as the posture of the planetary rolling element 20 is determined by coming into contact with the four rolling contact surfaces and the planetary rolling element 20 is rollable while coming into contact with the four rolling contact surfaces. The planetary rolling element 20 of the present embodiment is a rotating body (hereinafter referred to as "prolate spheroid") obtained by rotating an ellipse or an oval around a minor axis. Additionally, in the present specification, a circle formed by passing through the center of the minor axis of the planetary rolling element 20 and intersecting a plane perpendicular to a rotation axis Lb and the outer peripheral surface of the planetary rolling element 20 is referred to as an "equator". In this example, the equator is a great circle formed by the intersection of a plane perpendicular to the rotation axis Lb and the outer peripheral surface of the planetary rolling element 20.

The inclination of the rotation axis Lb of the planetary rolling element 20 with respect to the center axis La changes depending on the relative positions of the four rolling contact surfaces. That is, the rotation axis Lb may be parallel to the center axis La or may be inclined with respect to the center axis La.

A ratio Ra (=axial dimension/radial dimension) of the axial dimension of the planetary rolling element 20 to the radial dimension thereof will be described in a state in which the rotation axis Lb of the planetary rolling element 20 is parallel to the center axis La. When the ratio Ra is large, there is a possibility that a phenomenon occurs in which the planetary rolling element 20 rotates around a pseudo-rotation axis perpendicular to the original rotation axis Lb. From the viewpoint of suppressing this phenomenon, the ratio Ra is preferably 1 or less, more preferably 0.8 or less, and still more preferably 0.6 or less. The ratio Ra may be 0.1 or more.

Figure 3:
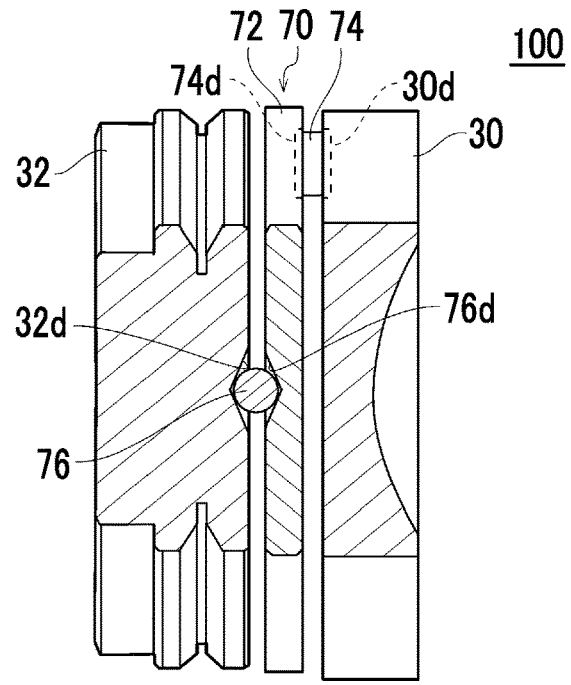
FIG. 3 is a side view showing the periphery of a coupling of the friction transmission device of FIG. 1.

The coupling 70 will be described with reference to FIG. 3. FIG. 3 is a side view showing the periphery of the coupling 70. This figure is shown in a partially broken manner. The coupling 70 is provided between the output raceway ring 30 and the output shaft 32. The coupling 70 absorbs the positional deviation between the output raceway ring 30 and the output shaft 32. The coupling 70 may have any configuration as long as the coupling 70 can absorb the offset between the input side and the counter-input side.

The coupling 70 of the present embodiment has a disc portion 72, a plurality of (for example, two) first rollers 74 disposed on the input side of the disc portion 72, and a plurality of (for example, two) second rollers 76 disposed on the counter-input side of the disc portion 72. The center axes of the two first rollers 74 extend radially, and these rollers are disposed symmetrically with respect to the center axis La interposed therebetween. The center axes of the two second rollers 76 extend radially, and these rollers are disposed symmetrically with respect to the center axis La interposed therebetween. The center axis of the first roller 74 and the center axis of the second roller 76 are perpendicular to each other. Hereinafter, when the first roller 74 and the second roller 76 are collectively referred to, these rollers are simply referred to as a "roller".

A first recessed portion 74d that accommodates the first roller 74 is provided on the input side of the disc portion 72, and a second recessed portion 76d that accommodates the second roller 76 is provided on the counter-input side. On the counter-input side of the output raceway ring 30, a raceway-ring-side recessed portion 30d that accommodates the first roller 74 is provided at a position corresponding to the first recessed portion 74d. On the input side of the output shaft 32, an output-shaft-side recessed portion 32d that accommodates the second roller 76 is provided at a position corresponding to the second recessed portion 76d. Hereinafter, the first recessed portion 74d, the second recessed portion 76d, the raceway-ring-side recessed portion 30d, and the output-shaft-side recessed portion 32d are collectively referred to as a "roller recessed portion".

As shown in FIG. 3, a bottom portion of the roller recessed portion is composed of an inclined surface having the deepest center in the circumferential direction, and has a V shape in a section as seen in the radial direction. A side surface of each roller is in contact with the V-shaped inclined surface. The roller is supported by the roller recessed portion with radial play. The roller recessed portion allows the roller to rotate and limit the radial movement of the roller to the range of the clearance. By moving the roller in the radial direction within the range of the clearance, misalignment in the radial direction can be absorbed. By moving the bottom portion of the roller recessed portion along the side surface of the roller, misalignment in the inclination direction can be absorbed.

The disc portion 72 functions as a spring that bends in the axial direction. For this reason, by using the disc portion 72 as a spring, the pressurization applied to the respective raceway rings can be adjusted. Additionally, when torque acts on the coupling 70, an axial load applied to the output raceway ring 30 increases due to the action of the V-shaped inclination of the bottom portion. For this reason, the coupling 70 can increase or decrease contact loads between the respective raceway rings and the planetary rolling element according to transmission torque. In this way, the coupling 70 transmits the rotation of the output raceway ring 30 to the output shaft 32 while absorbing the positional deviation (offset) between the output raceway ring 30 and the output shaft 32.

The output shaft 32 is connected to the output raceway ring 30 via the coupling 70 and rotates as the output raceway ring 30 rotates. The output shaft 32 may be referred to as an output flange. The output shaft 32 of the present embodiment has a substantial disc shape and is rotatably supported by the first casing 40 via the main bearing 34. The driven device is connected to the counter-input side of the output shaft 32.

Figure 2:
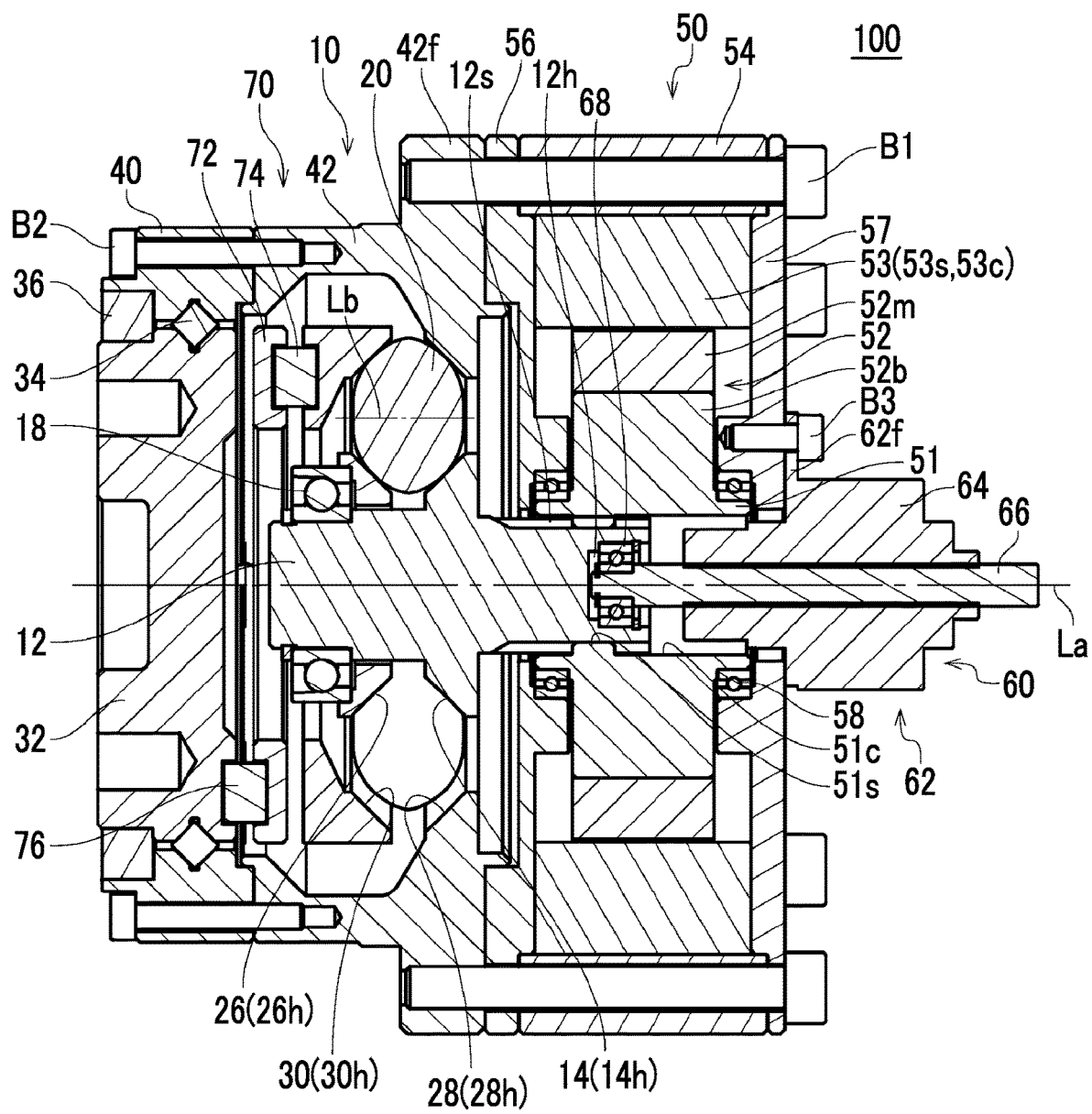
FIG. 2 is a sectional view showing a section of the friction transmission device of FIG. 1 along line A-A.

As shown in FIG. 2, the main bearing 34 is provided between the output shaft 32 and the first casing 40 and rotatably supports the output shaft 32 with respect to the first casing 40. Although the type of bearing is not limited, the main bearing 34 of the present embodiment is a cross roller bearing having a cylindrical roller as a rolling element. An inner ring of the main bearing 34 is provided integrally with the output shaft 32, and an outer ring of the main bearing 34 is provided integrally with the first casing 40.

As shown in FIG. 2, the oil seal 36 is provided between the output shaft 32 and the first casing 40 on the counter-input side of the main bearing 34. The oil seal 36 suppresses leakage of a lubricating material from the main bearing 34 and reduces entering of foreign matter into the main bearing 34.

As shown in FIG. 2, the first and second casings 40 and 42 are hollow substantially cylindrical members and function as an outer shell of the friction transmission device 100. The first and second casings 40 and 42 include the first casing 40 that surrounds mainly the output shaft 32, and the second casing 42 that is connected to the input side of the first casing 40 and surrounds mainly the coupling 70 and the transmission mechanism 10. The first casing 40 is connected to the second casing 42 by a bolt B2. A second support raceway ring 28 is provided on an inner peripheral side of the second casing 42. A flange portion 42f is provided on an outer peripheral side of the second casing 42. The second casing 42 is connected to the motor 50 by connecting the flange portion 42f to a motor casing 54, which will be described below, with bolt B1.

The motor 50 will be described with reference to FIG. 2. The type of the motor 50 is not limited, but the motor 50 of the present embodiment is an inner rotor type brushless motor having a motor shaft 51. The motor 50 mainly includes the motor shaft 51, the rotor 52, a stator 53, a motor casing 54, a first cover portion 56, a second cover portion 57, and a pair of motor bearings 58. The motor shaft 51 is a hollow shaft having a hollow portion 51c for advancing and retreating a linear motion shaft 66, which will be described below. The motor shaft 51 is supported on the first cover portion 56 and the second cover portion 57 by a pair of motor bearings 58 disposed apart from each other in the axial direction. The rotor 52 has a main body portion 52b integrally formed at an outer periphery of the motor shaft 51, and a cylindrical magnet 52m fixed to an outer periphery of the main body portion 52b and having a predetermined magnetic pole.

The stator 53 has a stator core 53s that faces a magnet 52m via a magnetic clearance, and an armature coil 53c provided on the stator core 53s. The motor casing 54 is a cylindrical member fixed to an outer periphery of the stator core 53s. The first cover portion 56 is a disc-shaped member that blocks the counter-input side of the motor casing 54. The second cover portion 57 is a disc-shaped member that blocks the input side of the motor casing 54. The first cover portion 56, the motor casing 54, and the second cover portion 57 are integrated by the bolt B1 and connected to the flange portion 42f.

The relative position change mechanism 60 will be described with reference to FIG. 2. As described above, the relative position change mechanism 60 is a mechanism that changes the relative positions of the input raceway ring 14, the output raceway ring 30, the first support raceway ring 26, and the second support raceway ring 28. The relative position change mechanism 60 may change the relative position between one or more of these four raceway rings and the remaining raceway ring. The relative position change mechanism 60 of the present embodiment has a moving mechanism 62 that integrally and relatively moves the input raceway ring 14 and the first support raceway ring 26 in the axial direction.

The moving mechanism 62 is a linear motion actuator having a linear motion shaft 66 that advances and retreats in the hollow portion 51c of the motor shaft 51, and an actuator main body 64 that generates an axial driving force on the linear motion shaft 66. The linear motion shaft 66 has a circular rod shape that extends in the axial direction. A part of the actuator main body 64 is housed in the hollow portion 51c of the motor shaft 51. The configuration of the moving mechanism 62 is not limited as long as the moving mechanism 62 can be driven to advance and retreat the linear motion shaft 66. For example, the linear motion shaft 66 may be driven by a stepping motor, or may be driven in the axial direction without rotation by a voice coil motor or the like. The moving mechanism 62 of the present embodiment converts a rotary motion into a linear motion by a ball screw mechanism, and drives the linear motion shaft 66 in the axial direction.

The actuator main body 64 is provided with an extension portion 62f that extends outward in the radial direction. The actuator main body 64 is connected to the motor 50 by fixing the extension portion 62f to the second cover portion 57 with a bolt B3.

A connecting hole 12h recessed on the counter-input side is provided at the end portion of the input shaft 12 on the input side. A tip of the linear motion shaft 66 is accommodated in the connecting hole 12h. A connecting bearing 68 is provided between the linear motion shaft 66 and the connecting hole 12h. An outer ring of the connecting bearing 68 is fixed to the connecting hole 12h, and an inner ring of the connecting bearing 68 is fixed to the tip of the linear motion shaft 66. With this configuration, the input shaft 12 and the linear motion shaft 66 are rotatably connected to each other. In addition, in a case where the linear motion shaft 66 moves without rotation, the linear motion shaft 66 and the input shaft 12 may be connected to each other without via the connecting bearing 68.

When the linear motion shaft 66 moves in the axial direction, the input shaft 12 also moves in the axial direction, and accordingly, the input raceway ring 14 and the first support raceway ring 26 move to the input side or the counter-input side, and relative relationships between these rings and the output raceway ring 30 and the second support raceway ring 28 are changed. By changing the relative relationships, a change gear ratio Rs of the transmission mechanism 10 is changed. In this way, in the present embodiment, the change gear ratio Rs can be changed by a simple configuration in which the input shaft 12 is moved in the axial direction. Additionally, since the linear motion shaft 66 is disposed in the hollow portion 51c of the motor shaft 51, the size of the device can be reduced.

Figure 4:
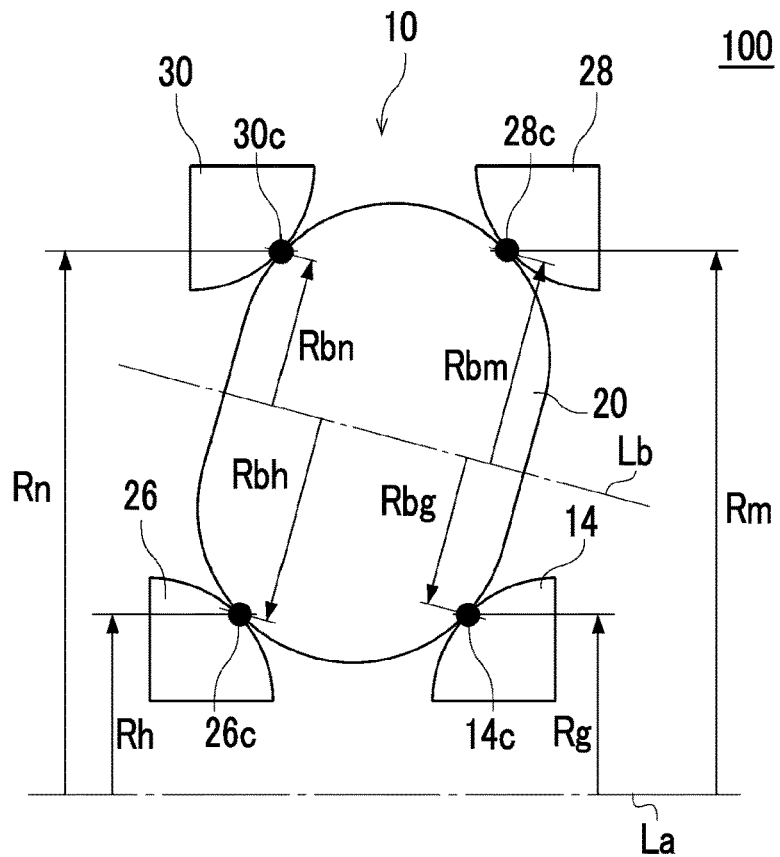
FIG. 4 is an explanatory diagram illustrating the operation of the friction transmission device of FIG. 1.

The operation of the transmission mechanism 10 will be described with reference to FIG. 4. FIG. 4 is an explanatory diagram illustrating the operation of the transmission mechanism 10. In this figure, each rolling contact surface is drawn in a curved surface shape, but each rolling contact surface is flat in a contact region with the planetary rolling element 20. When the input raceway ring 14 rotates, the planetary rolling element 20 revolves around a revolution axis while rotating around the rotation axis Lb. In this example, since the revolution axis of the planetary rolling element 20 coincides with the center axis La, the center axis La will be described below as the revolution axis.

The contact points between the planetary rolling element 20 and the input raceway ring 14, the first support raceway ring 26, the second support raceway ring 28, and the output raceway ring 30 are referred to as an input contact point 14c, a first support contact point 26c, a second support contact point 28c, and an output contact point 30c. As shown in FIG. 4, the rotation radii of the contact points 14c, 26c, 28c, and 30c are referred to as Rbg, Rbh, Rbm, Rbn, and the revolution radii of the contact points 14c, 26c, 28c, and 30c are Rg, Rh, Rm, and Rn.

In a case where the first support raceway ring 26 freely rotates and the second support raceway ring 28 is stationary without rotation, the ratio (hereinafter, referred to as the "change gear ratio Rs") of a rotation speed ω2 of the output raceway ring 30 to a rotation speed ω1 of the input raceway ring 14 is represented by the following equation 1:

Change gear ratio Rs=Output rotation speed ω2/Input rotation speed ω1=(Rbm/Rm−Rbn/Rn)/(Rbn/Rn+Rbm/Rm)  Equation 1

In the state of FIG. 4, the planetary rolling element 20 has a posture in which the input side of the rotation axis Lb approaches the center axis La. When the positions of the input raceway ring 14 and the first support raceway ring 26 are changed to the input side by the relative position change mechanism 60, the posture of the planetary rolling element 20 is changed such that the counter-input side of the rotation axis Lb approaches the center axis La. As a result, the rotation radius and the revolution radius of each contact point are changed, and the change gear ratio Rs is also changed. In this way, the change gear ratio Rs of the transmission mechanism 10 can be changed by changing the relative positions of the respective raceway rings to changing the posture of the planetary rolling element 20. Conversely, by constantly supporting the posture of the planetary rolling element 20, the change gear ratio Rs is kept constant.

In order to suppress fluctuations in the posture of the planetary rolling element 20, as an example, as in the transmission described in the related art, a configuration may be provided in which a shaft member is provided on the planetary rolling element 20 along the rotation axis Lb, and the shaft member is supported by a bearing. In this case, the planetary rolling element 20 is supported by the shaft member. In the present embodiment, the planetary rolling element 20 is supported by the input raceway ring 14, the output raceway ring 30, the first support raceway ring 26, and the second support raceway ring 28 without being supported by the shaft member.

Figure 5:
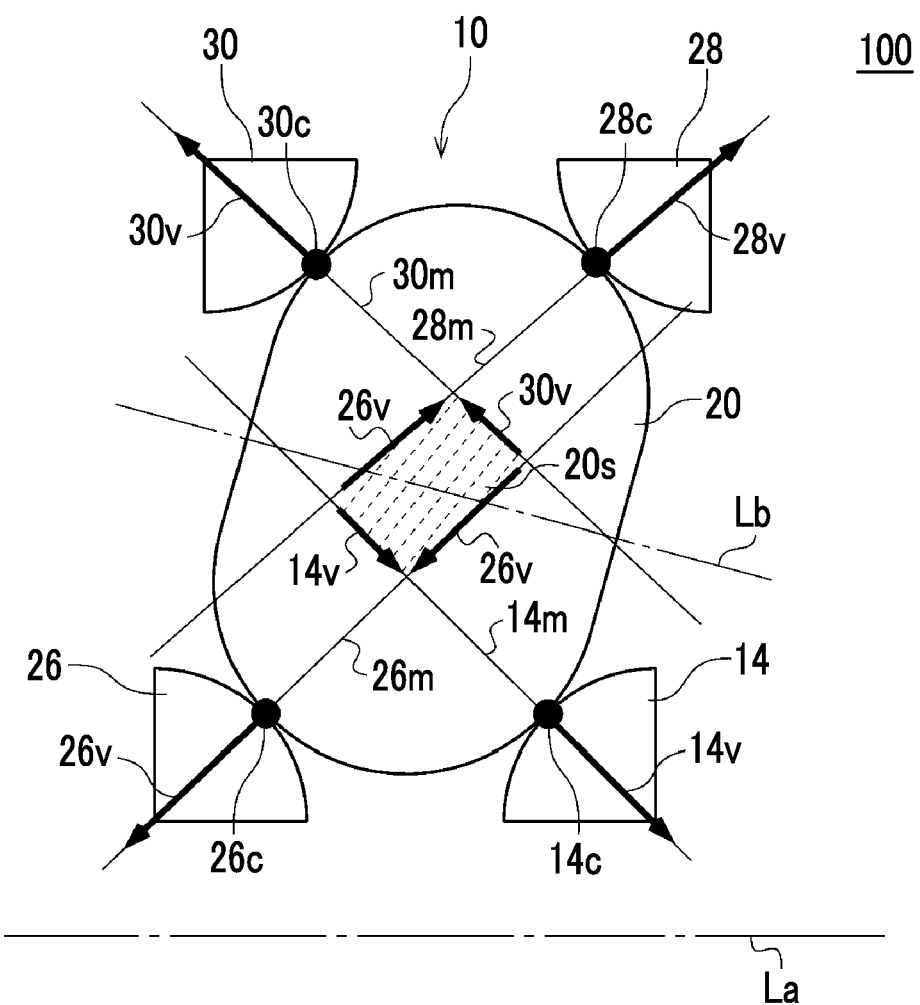
FIG. 5 is an explanatory diagram illustrating a support configuration of a planetary rolling element of FIG. 1.

A configuration in which the planetary rolling element 20 is supported by the raceway rings will be described with reference to FIG. 5. FIG. 5 is an explanatory diagram illustrating a configuration in which the planetary rolling element 20 is supported by the respective raceway rings. This figure shows extension lines of respective vectors in a plane including the center axis La and the rotation axis Lb. As shown in FIG. 5, in the present embodiment, a quadrangle is formed by extension lines of normal vectors at the contact points between the planetary rolling element and the respective raceway rings. Depending on the shape of the planetary rolling element 20, the quadrangle formed by the extension lines is not formed, and the posture of the planetary rolling element 20 becomes unstable.

As shown in FIG. 5, regarding a normal vector 14v at the input contact point 14c, a normal vector 26v at the first support contact point 26c, a normal vector 28v at the second support contact point 28c, and a normal vector 30v at the output contact point 30c, the extension lines 14m, 26m, 28m, and 30m of the normal vectors intersect each other to form a quadrangle 20s. With this configuration, the posture of the planetary rolling element 20 is uniquely determined, and the posture of the planetary rolling element 20 is maintained without being supported by the shaft member. In addition, as long as the quadrangle 20s is a protruding quadrangle (a quadrangle having no angular portions of which the internal angle is 180 degrees or more), the stability of the posture is further improved.

The area of the quadrangle 20s may be too small depending on the shape of the planetary rolling element 20. When the area of the quadrangle 20s is too small, there is a possibility that the posture of the planetary rolling element 20 becomes unstable. From the viewpoint of stabilizing the posture, the area of the quadrangle 20s is preferably 4% or more, more preferably 25% or more, and still more preferably 60% or more of the cross-sectional area of the planetary rolling element 20. The area of the quadrangle 20s may be 15% or more of the cross-sectional area of the planetary rolling element 20.

The directions of the normal vectors of the opposite sides of the quadrangle 20s may be the same depending on the shape of the planetary rolling element 20. In a case where the directions of the normal vectors of the opposite sides of the quadrangle 20s are the same, there is a possibility that the posture of the planetary rolling element 20 becomes unstable. Thus, in the present embodiment, the normal vectors of the opposite sides of the quadrangle are configured to have opposite directions. Specifically, the normal vector 14v and the normal vector 30v are in opposite directions, and the normal vector 26v and the normal vector 28v are in opposite directions. In this case, since the position and direction of the planetary rolling element 20 are constrained by the respective raceway rings, the posture of the planetary rolling element 20 is further stabilized. Additionally, in a case where both of the normal vectors of two adjacent sides of the quadrangle 20s are directed in a direction toward the angular portions or away from the angular portions, the posture becomes more stable.

When the contact surfaces of each raceway ring and the planetary rolling element 20 are both flat surfaces, the contact area increases and mechanical loss increases, and when the contact surfaces are both curved surfaces, the manufacturing effort increases. For this reason, in the present embodiment, with respect to the contact surfaces of the input contact point 14c, the first support contact point 26c, the second support contact point 28c, and the output contact point 30c, the respective raceway rings are flat surfaces, and the surfaces of the planetary rolling element 20 facing the respective raceway rings are curved surfaces. In this case, the increase in mechanical loss can be suppressed, and the manufacturing of the member becomes easy. The curved surfaces of the planetary rolling element 20 are not limited, but in this example, the curved surfaces have the contour of an involute curve.

The operation of the friction transmission device 100 configured as described above will be described. When rotational power is transmitted from the motor shaft 51 to the input shaft 12, the input raceway ring 14 rotates around the center axis La. The rotation of the input raceway ring 14 causes the planetary rolling element 20 to rotate and revolve. The rotation of the planetary rolling element 20 is transmitted to the output raceway ring 30, and the output raceway ring 30 rotates according to the above-described change gear ratio Rs. The rotation of the output raceway ring 30 is output to the output shaft 32 via the coupling 70. When the positions of the input raceway ring 14 and the first support raceway ring 26 are changed by the relative position change mechanism 60, the change gear ratio Rs is changed.

The features of the friction transmission device 100 will be described. In the friction transmission device 100, since the quadrangle is configured to be formed by the extension lines of the normal vectors at the contact points between the planetary rolling element 20 and the respective raceway rings, the posture of the planetary rolling element 20 is stable as compared to a case where the quadrangle is not formed by the extension lines. Since the configuration for maintaining the posture of the planetary rolling element 20 is simple, the manufacturing cost can be reduced.

In the friction transmission device 100, the planetary rolling element 20 is supported by the input raceway ring 14, the output raceway ring 30, the first support raceway ring 26, and the second support raceway ring 28 without being supported by the shaft member, the manufacturing cost of the shaft member and the peripheral members thereof can be reduced.

Another Embodiment

A friction transmission device 100 according to another embodiment of the present disclosure will be described with reference to FIGS. 6 to 9. In the drawings and descriptions of another embodiment, the same or equivalent components and members as those of one embodiment will be designated by the same reference numerals. The description that overlaps that of one embodiment will be appropriately omitted, and the configuration different from that of one embodiment will be described intensively. The friction transmission device 100 of the present embodiment is different from one embodiment in that the shape of the rolling element and the shapes of the contact portions between the rolling element and the respective raceway rings are different, and the other configurations are the same. Therefore, these differences will mainly be described intensively.

Figure 6:
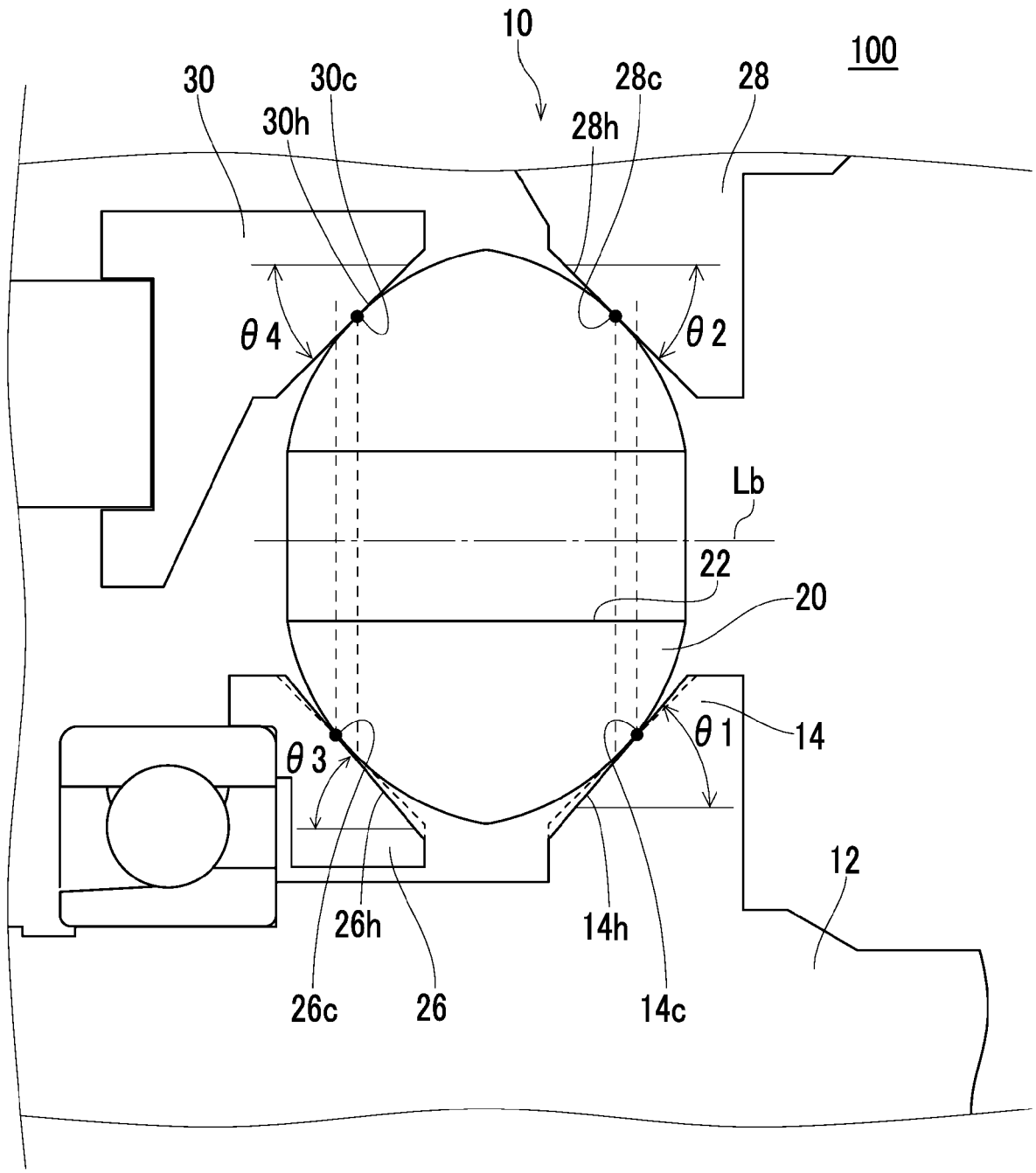
FIG. 6 is a sectional view showing the periphery of a planetary rolling element of the friction transmission device according to another embodiment.

FIG. 6 is a sectional view showing the periphery of the planetary rolling element 20 of the friction transmission device 100 of the embodiment. In the description of one embodiment, an example is shown in which the curved surface of the planetary rolling element 20 has the contour of the involute curve, but in the present embodiment, a contact portion with each raceway ring is an arc in the axial section of the planetary rolling element 20. In this example, in the axial section of the planetary rolling element 20, the curved surface of a contact portion with each of the raceway rings 14, 26, 28 and the raceway ring 30 has the contour of an arc curve. In this case, since the contour of a raceway surface of the planetary rolling element 20 is the arc, it becomes easy to machine the rolling element and measure and manage the contour after the machining become easy, which is advantageous in terms of cost reduction and quality stabilization.

The positions of the contact points of the rolling element will be described with reference to FIG. 6. As shown by broken lines in FIG. 6, when the positions of contact points with inner raceway rings and contact points with outer raceway rings in the planetary rolling element 20 overlap each other, there is a possibility that stress is concentrated on those positions and fatigue is accumulated, and the life of the planetary rolling element 20 is shortened. Thus, in the present embodiment, the respective contact points of the inner raceway rings and the outer raceway rings, which are disposed at overlapping positions when viewed from the radial direction, with the planetary rolling elements 20 deviate from each other in the axial direction.

Specifically, as shown in FIG. 6, the input raceway ring 14 and the second support raceway ring 28 are disposed at overlapping positions when viewed from the radial direction, and the contact point 14c between the planetary rolling element 20 and the input raceway ring 14 and the contact point 28c between the planetary rolling element 20 and the second support raceway ring 28 deviate from each other in the axial direction. For example, in order to realize this configuration, a configuration may be adopted in which a contact angle θ1 of the rolling contact surface 14h (shown by a solid line in FIG. 6) of the input raceway ring 14 is different from a contact angle θ2 of the rolling contact surface 28h of the second support raceway ring 28.

Additionally, the output raceway ring 30 and the first support raceway ring 26 are disposed at overlapping positions when viewed from the radial direction, and the contact point 30c between the planetary rolling element 20 and the output raceway ring 30 and the contact point 26c between the planetary rolling element 20 and the first support raceway ring 26 deviate from each other in the axial direction. For example, in order to realize this configuration, the contact angle θ3 of the rolling contact surface 26h (shown by the solid line in FIG. 6) of the first support raceway ring 26 may be different from the contact angle θ4 of the rolling contact surface 30h of the output raceway ring 30.

In this way, as the raceway surfaces on the inner ring side and the outer ring side have different contact angle and the contact points of the raceway rings on the inner ring side and the contact points of the raceway rings on the outer ring side are caused to deviate from each other in the axial direction, the stress of the rolling element can be distributed to reduce the accumulation of fatigue and the life can be extended.

The recessed portion of the rolling element will be described with reference to FIG. 6. The shape and dimensions of the rolling element have manufacturing variations. In a case where the dimensional variation of the planetary rolling element is large and the stiffness of the planetary rolling element is high, it is considered that the contact pressure of the contact portion becomes partially excessive and the life is shortened. Thus, the planetary rolling element 20 of the present embodiment has a recessed portion 22 at a central portion. The recessed portion 22 may be a bottomed hole, but the recessed portion 22 in this example is a through-hole. By having the recessed portion 22 at the central portion, the planetary rolling element 20 can be bent according to the contact load acting on the raceway surface. Thus, the influence of the dimensional variation of the rolling element can be suppressed, and the life can be extended.

Figure 7:
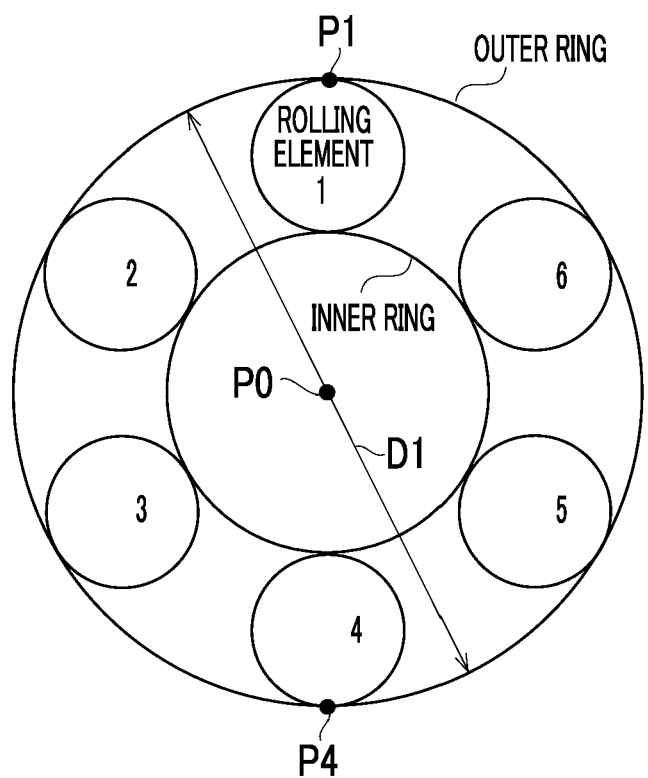
FIG. 7 is a schematic diagram showing a relationship between raceway rings and rolling elements of the friction transmission device of FIG. 6.
Figure 8:
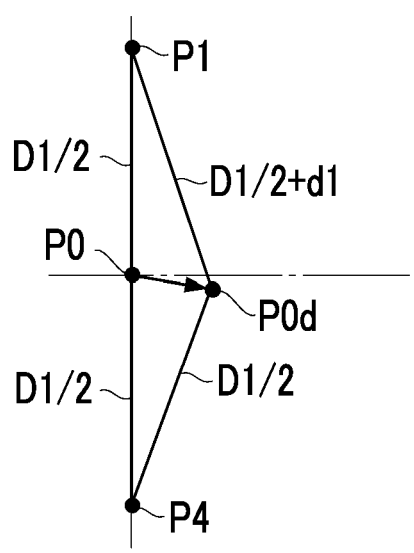
FIG. 8 is a diagram conceptually showing the influence of an error in the diameter of the rolling element of the friction transmission device of FIG. 6 on the center position of an input shaft.
Figure 9:
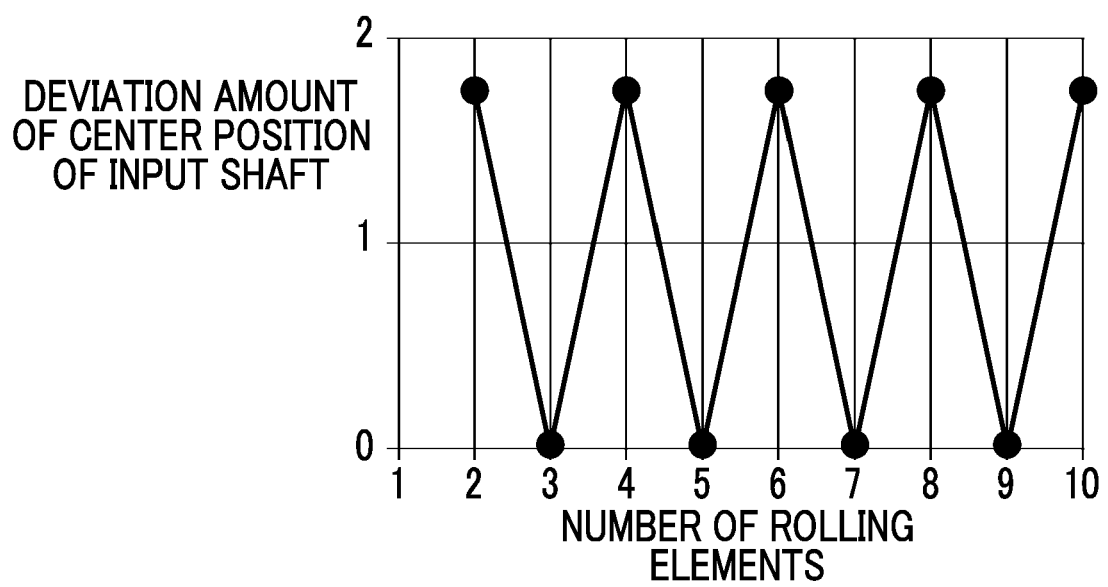
FIG. 9 is a diagram showing a relationship between the number of rolling elements of the friction transmission device of FIG. 6 and the deviation amount of the center position of the input shaft.

With reference to FIGS. 7, 8, and 9, the influence of the variation in the diameter of the rolling element on the deviation of the center position of the input shaft 12 will be described. FIG. 7 is a schematic diagram showing a relationship between raceway rings and rolling elements. In this figure, the raceway rings and the rolling elements are shown in two dimensions for ease of understanding. In this figure, a radially outer raceway ring is shown in a circle as an outer ring, and a radially inner raceway ring is shown in a circle as an inner ring. All rolling elements (rolling elements 1 to 6) are in contact with the outer ring and the inner ring. The diameter of the outer ring is indicated by D1, and the center position of the input shaft 12 is indicated by P0.

FIG. 8 is a diagram conceptually showing the influence of an error in the diameter of the rolling element on the center position of the input shaft 12. In this figure, a contact point between the rolling element 1 and the outer ring is indicated by P1, a contact point between the rolling element 4 on the opposite side of the rolling element 1 and the outer ring is indicated by P4, and the center position of the input shaft 12 in a case where the rolling elements 1 to 6 all have the same diameter is indicated by P0. As shown in FIG. 8, in a case where the diameter of the rolling element 1 is larger than that of the other rolling elements 2 to 6 by d1, the center position of the input shaft 12 deviates from P0 as shown by P0d. That is, the deviation amount of the center position of the input shaft 12 can be obtained through calculation by a geometric relationship shown in FIG. 8.

FIG. 9 is a diagram showing a relationship between the number of rolling elements and the deviation amount of the center position of the input shaft 12. This figure shows the result obtained by calculating the deviation amount of the center position of the input shaft 12 from the number of rolling elements using the geometric relationship of FIG. 8. In this figure, the horizontal axis represents the number of rolling elements, and the vertical axis represents a relative value obtained by dividing the deviation amount of the center position of the input shaft 12 by a predetermined unit amount. From the study of FIG. 9, it was found that the deviation amount of the center position of the input shaft 12 resulting from the variation in the diameter of the rolling element in a case where the number of rolling elements is an odd number is smaller than that in a case where the number of rolling elements is an even number. On the basis of this result, since the present embodiment has a configuration in which an odd number (for example, 7) of planetary rolling elements 20 are provided, the influence of variation in the diameter of the rolling elements is reduced.

According to the present embodiment, the same actions and effects as those of one embodiment are exhibited. In addition, the present embodiment is easy to manufacture because the contact portion of the planetary rolling element is the arc. Additionally, in the present embodiment, since the inner and outer contact points deviate from each other in the axial direction, the stress of the rolling element can be distributed. Additionally, since the present embodiment has the recessed portion at the central portion, the influence of dimensional variation of the rolling element can be suppressed. Additionally, since the present embodiment has an odd number of rolling elements, the influence of variation in the diameter of the rolling elements can be suppressed.

The examples of the embodiments of the present invention have been described in detail above. All of the aforementioned embodiments merely show specific examples for carrying out the present invention. The contents of the embodiments do not limit the technical scope of the present invention, and many design changes such as changes, additions, and deletions of components can be made without departing from the idea of the invention defined in the claims. In the aforementioned embodiments, the contents that can be changed in such designs are described with notations such as "of the embodiment" and "in the embodiment" but do not mean that design changes are not allowed for the contents without such notations. Additionally, the hatching given to the section of the drawing does not limit the material of a hatched object.

Hereinafter, modification examples will be described. In the drawings and description of modification examples, the same or equivalent components and members as those of the embodiments will be designated by the same reference numerals. The description that overlaps that of the embodiments will be appropriately omitted, and the configuration different from that of the embodiment will be described intensively.

One Modification Example

Figure 10:
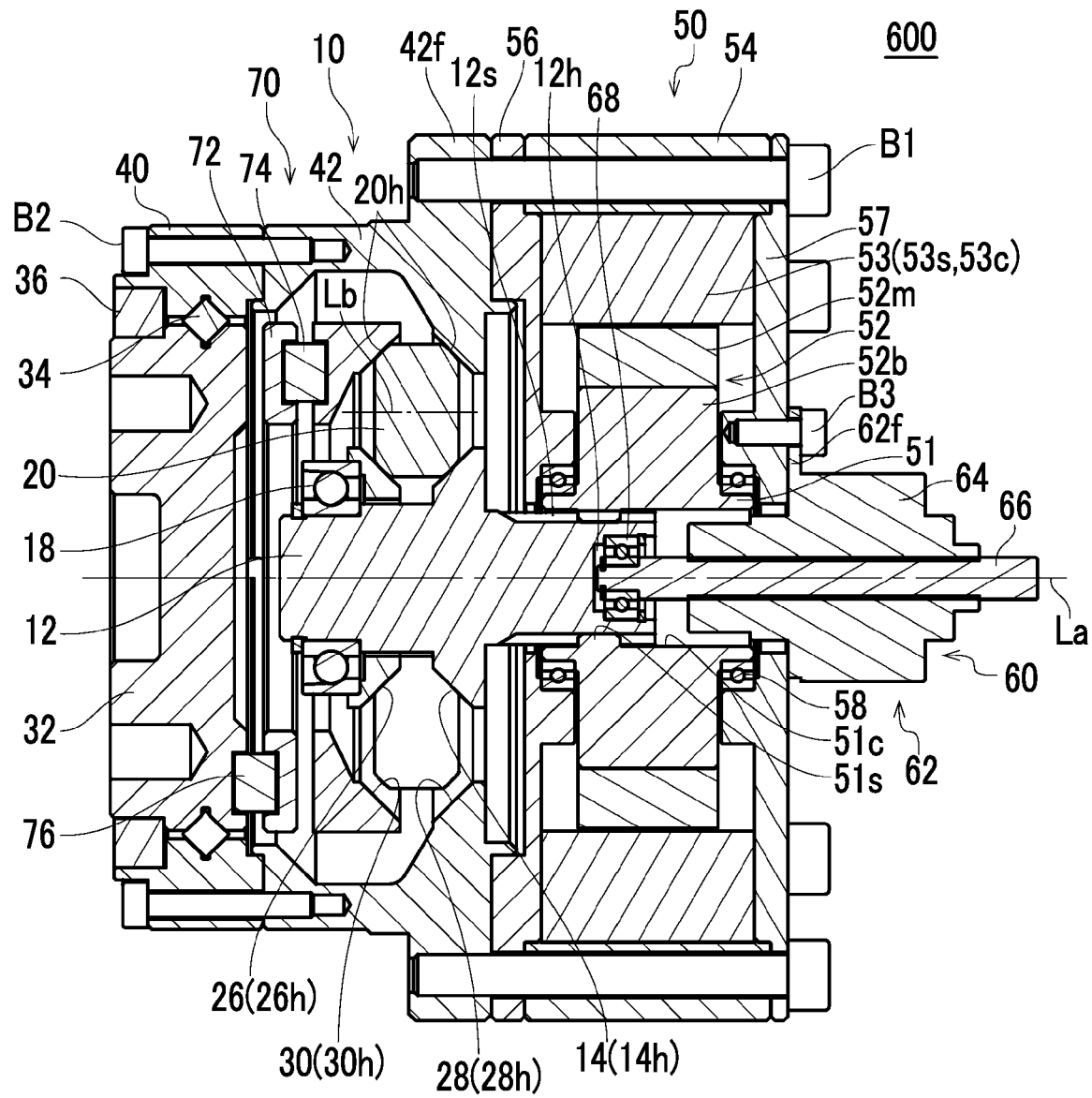
FIG. 10 is a sectional view showing a friction transmission device of one modification example.

FIG. 10 is a sectional view showing a friction transmission device 200 according to one modification example and corresponds to FIG. 2. The present modification example is mainly different from the embodiments in that the shape of each raceway ring is different from that of the planetary rolling element 20, and the other configurations are the same. Therefore, different configurations will be described. The planetary rolling element 20 of the present modification example is a rotating body obtained by rotating a rectangle having an angle R. The planetary rolling element 20 has a curved surface portion 20h formed by rotating the angle R. The rolling contact surfaces 14h, 26h, 28h, and 30h are in contact with the curved surface portion 20h. The friction transmission device 200 operates similar to the embodiments.

Another Modification Example

Figure 11:
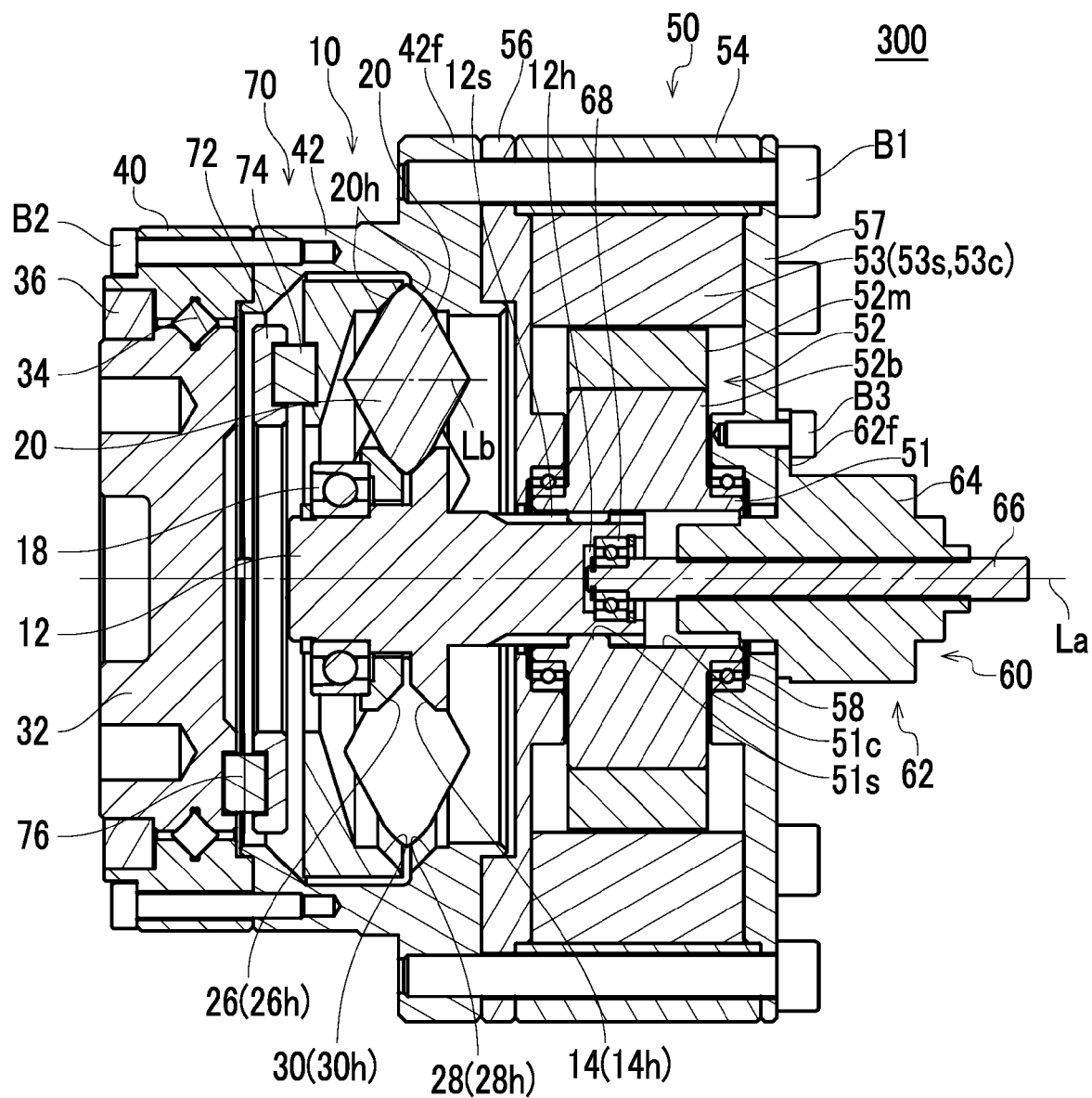
FIG. 11 is a sectional view showing a friction transmission device of another modification example.

FIG. 11 is a sectional view showing a friction transmission device 300 of another modification example and corresponds to FIG. 2. The present modification example is mainly different from the embodiments in that the shape of each raceway ring is different from that of the planetary rolling element 20, and the other configurations are the same. Therefore, different configurations will be described. The planetary rolling element 20 of the present modification example is a rotating body obtained by rotating a figure having a curved portion in the vicinity of an intersection point of two sides on an apex side of a triangle around the other side. The planetary rolling element 20 has a substantially rhombic section. The planetary rolling element 20 has the curved surface portion 20h formed by rotating this curved portion. Each raceway ring has a shape that comes into contact with the curved surface portion 20h of the planetary rolling element 20. The rolling contact surfaces 14h, 26h, 28h, and 30h are in contact with the curved surface portion 20h. The friction transmission device 300 operates similar to the embodiments and has the same characteristics.

Still Another Modification Example

Figure 12:
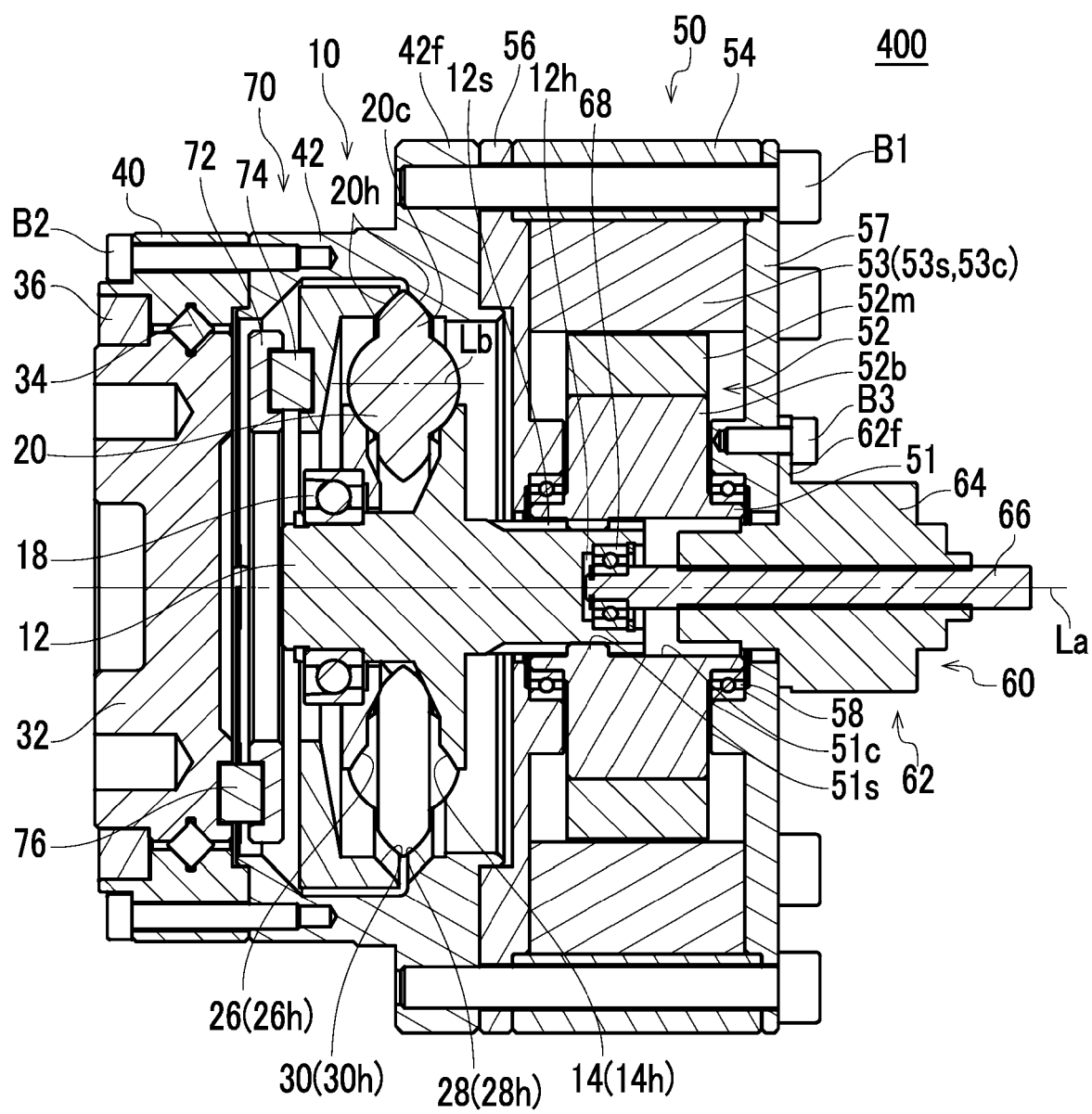
FIG. 12 is a sectional view showing a friction transmission device of still another modification example.

FIG. 12 is a sectional view showing a friction transmission device 400 of still another modification example and corresponds to FIG. 2. The present modification example is mainly different from the embodiments in that the shape of each raceway ring is different from that of the planetary rolling element 20, and the other configurations are the same. Therefore, different configurations will be described. The planetary rolling element 20 of the present modification example is composed of a semicircle and a pentagon that protrudes from the center of the arc of the semicircle to the opposite side of the chord of the semicircle, and is a rotating body obtained by rotating a figure having curved portions on two sides on the apex side of this pentagon around the chord of this semicircle. The planetary rolling element 20 has a peripheral protrusion 20c in which the equator protrudes in a protruding shape. The planetary rolling element 20 has the curved surface portion 20h formed by rotating a pentagonal curved portion. The rolling contact surfaces 14h and 26h are in contact with a region corresponding to the arc of the semicircle, and the rolling contact surfaces 28h and 30h are in contact with the curved surface portion 20h. The friction transmission device 400 operates similarly to the embodiments and has the same characteristics.

Further Modification Example

Figure 13:
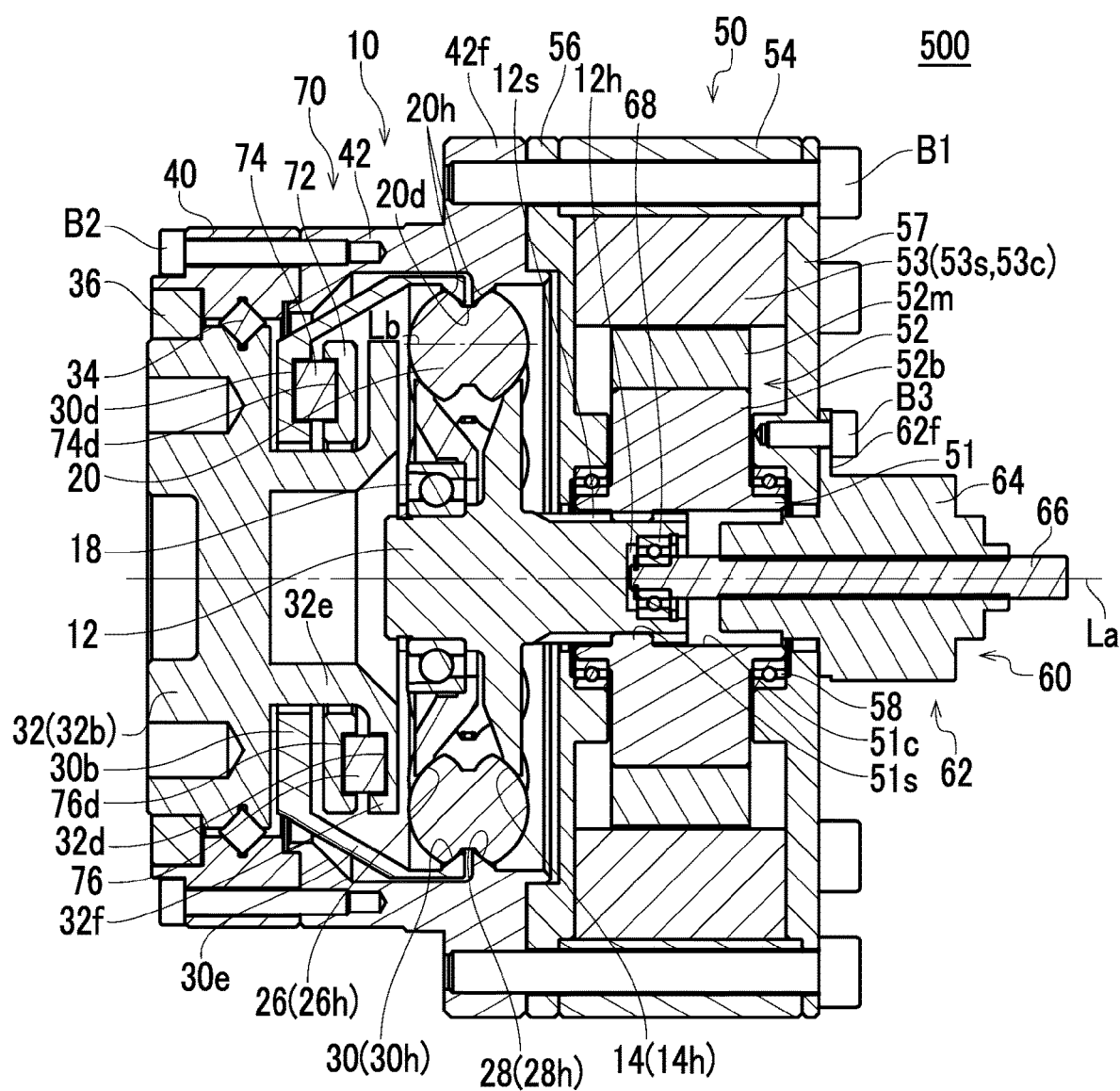
FIG. 13 is a sectional view showing a friction transmission device of further modification example.

FIG. 13 is a sectional view showing a friction transmission device 500 of further modification example and corresponds to FIG. 2. The present modification example is mainly different from the embodiments in that the shapes of the respective raceway rings, the output raceway ring 30, the disc portion 72, and the output shaft 32 are different from those of the planetary rolling element 20, and the other configurations are the same. Therefore, different configurations will be described. The planetary rolling element 20 of the present modification example is a rotating body obtained by being recessed from the center of the arc of the semicircle toward the chord of the semicircle and rotating a figure having a curved portion in the recess around the chord of the semicircle. The planetary rolling element 20 has a peripheral recessed portion 20d in which the equator of a sphere is recessed in a peripheral shape, and the curved surface portion 20h is formed in the peripheral recessed portion 20d. The rolling contact surfaces 14h and 26h are in contact with a region corresponding to the arc of the semicircle of the planetary rolling element 20, and the rolling contact surfaces 28h and 30h are in contact with the curved surface portion 20h.

The first roller 74 and the first recessed portion 74d are provided on the counter-input side of the disc portion 72, and the second roller 76 and the second recessed portion 76d are provided on the input side of the disc portion 72. The output raceway ring 30 has a disk-shaped portion 30b disposed on the counter-input side of the disc portion 72 via a clearance, and a tubular extension portion 30e that extends from an outer periphery of the disk-shaped portion 30b to the input side. The rolling contact surface 30h is provided at an end portion of the tubular extension portion 30e on the input side, and a raceway-ring-side recessed portion 30d is provided on the input side of the disk-shaped portion 30b.

The output shaft 32 has an output shaft main body portion 32b, a tubular extension portion 32e that extends from an end surface of the output shaft main body portion 32b on the input side to the input side, and a flange portion 32f that overhangs in the radial direction from an end portion of the tubular extension portion 32e on the input side. The flange portion 32f has a disc shape that is disposed on the input side of the disc portion 72 via a clearance. The output-shaft-side recessed portion 32d is provided on the counter-input side of the flange portion 32f. The friction transmission device 500 operates similarly to the embodiments and has the same characteristics.

Still Further Modification Example

Figure 14:
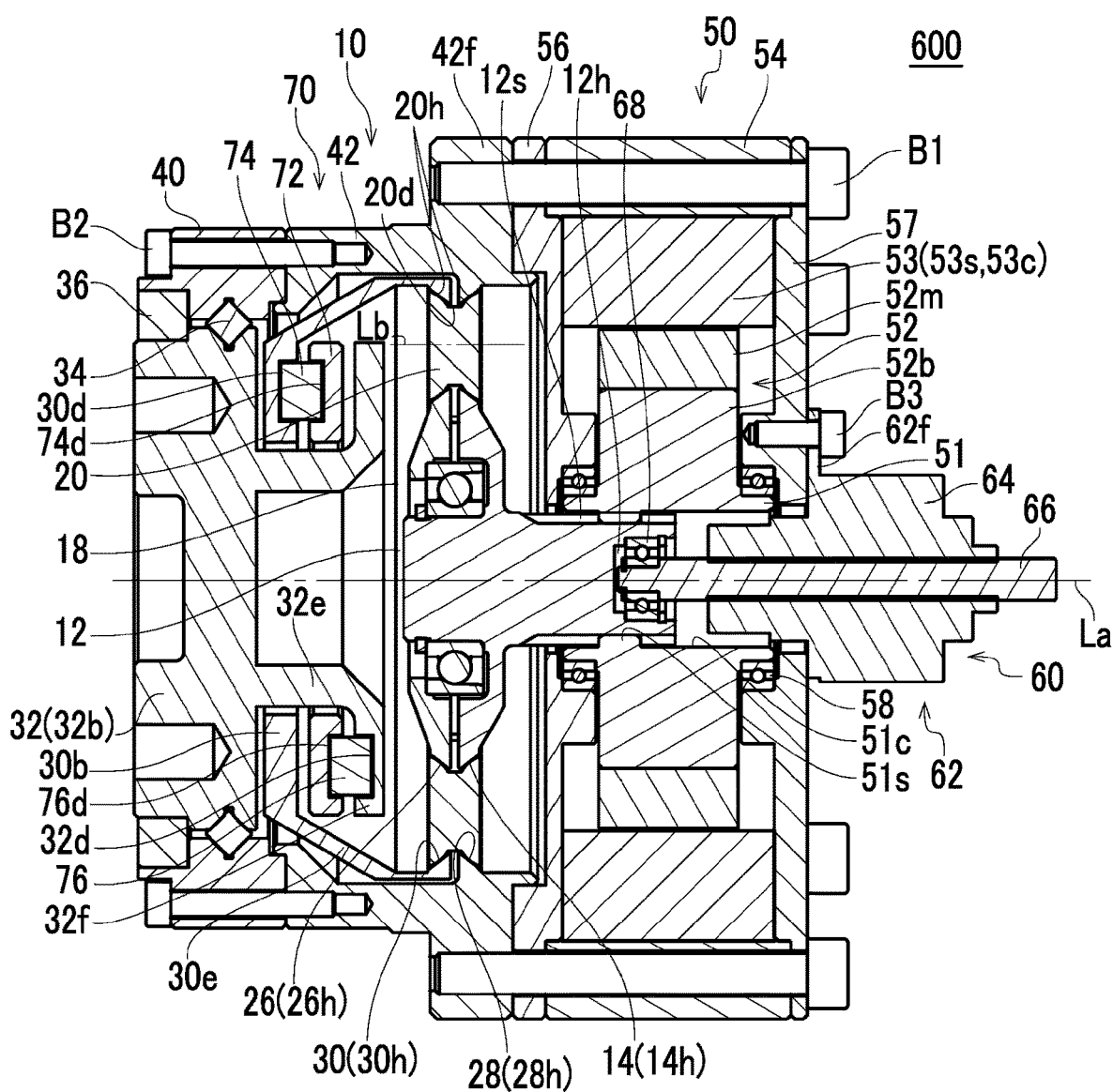
FIG. 14 is a sectional view showing a friction transmission device of still further modification example.

FIG. 14 is a sectional view showing a friction transmission device 600 of still further modification example and corresponds to FIG. 13. The present modification example is mainly different from further modification example in that the shape of each raceway ring is different from that of the planetary rolling element 20, and the other configurations are the same. Therefore, different configurations will be described. The planetary rolling element 20 of the present modification example is a rotating body obtained by rotating a rectangle having one V-shaped recessed side around the opposite side of the recessed side. The planetary rolling element 20 has a peripheral recessed portion 20d in which the equator is recessed in a peripheral shape, and the curved surface portion 20h is formed in the peripheral recessed portion 20d. The rolling contact surfaces 14h, 26h, 28h, and 30h are in contact with the curved surface portion 20h. The friction transmission device 600 operates similar to the embodiments and has the same characteristics.

Other Modification Examples

In the description of the embodiments, an example having two support raceway rings 26 and 28 has been shown, but the present invention is not limited to this, and three or more support raceway rings may be provided.

In the description of the embodiments, an example has been shown in which the first support raceway ring 26 freely rotates and the second support raceway ring 28 is stationary, but the present invention is not limited thereto. The first support raceway ring 26 may be stationary and the second support raceway ring 28 may rotate freely.

In the description of the embodiments, with respect to the rotation axis of the planetary rolling element 20, the input raceway ring 14 is disposed on the radially inner side and the output raceway ring 30 is disposed on the radially outer side. However, the present invention is not limited to this, and the input raceway ring 14 may be disposed on the outer side and the output raceway ring 30 may be disposed on the inner side, both may be disposed on the inner side, or both may be disposed on the outer side.

The above-described respective modification example examples have the same actions and effects as those of the embodiments.

Any combination of the components of the above-described embodiments and any of the modification examples is also useful as embodiments of the present invention. New embodiments resulting from the combination also have the respective effects of the combined embodiments and the modification examples.

The present invention can be used as the friction transmission device.

It should be understood that the invention is not limited to the above-described embodiment, but may be modified into various forms on the basis of the spirit of the invention. Additionally, the modifications are included in the scope of the invention.

What is claimed is:

1. A friction transmission device comprising:
   an input raceway ring;
   a planetary rolling element that is disposed around a rotation axis of the input raceway ring and comes into contact with the input raceway ring;
   an output raceway ring that comes into contact with the planetary rolling element and is connected to an output shaft, the output raceway ring being configured to change a speed of rotation transmitted from the input raceway ring and output the rotation with changed speed; and
   a first support raceway ring and a second support raceway ring that come into contact with the planetary rolling element;
   a relative position change mechanism that changes relative positions of the input raceway ring, the output raceway ring, the first support raceway ring, and the second support raceway ring,
   wherein a quadrangle is formed by extension lines of normal vectors at contact points between the planetary rolling element and the respective raceway rings, and
   wherein the relative position change mechanism includes a moving mechanism that integrally moves the input raceway ring and the first support raceway ring in the same axial direction.

2. The friction transmission device according to claim 1, wherein normal vectors of opposite sides of the quadrangle are in opposite directions.

3. The friction transmission device according to claim 1, wherein the moving mechanism has a linear motion shaft that advances and retreats in a hollow portion of a motor shaft.

4. The friction transmission device according to claim 1, further comprising:
   a coupling that absorbs a positional deviation between the output raceway ring and the output shaft.

5. The friction transmission device according to claim 1, wherein each of the raceway rings is a flat surface, and a surface of the planetary rolling element facing each raceway ring is a curved surface.

6. The friction transmission device according to claim 5, wherein a contact portion with each of the raceway rings is an arc in an axial section of the planetary rolling element.

7. The friction transmission device according to claim 1, wherein any one of the first support raceway ring and the second support raceway ring is disposed at a position overlapping the input raceway ring when viewed in a radial direction, and
   a contact point between the planetary rolling element and the input raceway ring, and a contact point between the planetary rolling element and the one raceway ring deviate from each other in an axial direction.

8. The friction transmission device according to claim 1, wherein the planetary rolling element has a recessed portion at a central portion.

9. The friction transmission device according to claim 1, further comprising:
   an odd number of the planetary rolling elements.

10. The friction transmission device according to claim 1, wherein a ratio of an axial dimension of the planetary rolling element to a radial dimension of the planetary rolling element is 1 or less.

11. The friction transmission device according to claim 1, wherein in a case where, among four raceway rings of the input raceway ring, the output raceway ring, the first support raceway ring, and the second support raceway ring, the raceway ring disposed on a radially outer side is defined as an outer raceway ring and the raceway ring disposed on a radially inner side is defined as an inner raceway ring,
   the planetary rolling element has a circumferentially recessed portion that is circumferentially recessed, and the circumferentially recessed portion is in contact with at least one of the outer raceway ring and the inner raceway ring.

12. The friction transmission device according to claim 11,
    wherein the circumferentially recessed portions are in contact with both the outer raceway ring and the inner raceway ring, respectively.

13. The friction transmission device according to claim 1, further comprising:
    an input shaft; and
    an input shaft bearing,
    wherein the input shaft bearing includes an inner ring attached to the input shaft and an outer ring fixed to the first support raceway ring.

14. A friction transmission device comprising:
    an input raceway ring;
    a planetary rolling element that is disposed around a rotation axis of the input raceway ring and comes into contact with the input raceway ring;
    an output raceway ring that comes into contact with the planetary rolling element and is connected to an output shaft, the output raceway ring being configured to change a speed of rotation transmitted from the input raceway ring and output the rotation with changed speed; and
    a first support raceway ring and a second support raceway ring that come into contact with the planetary rolling element,
    wherein the planetary rolling element is supported by the input raceway ring, the output raceway ring, the first support raceway ring, and the second support raceway ring without being supported by a shaft member,
    wherein with respect to the planetary rolling element, the input raceway ring is disposed on one side of a radially outer side and a radially inner side, and
    wherein the first support raceway ring is disposed on the one side and is rotatable relative to the input raceway ring.

15. The friction transmission device according to claim 14, further comprising:
    an input shaft; and
    an input shaft bearing,
    wherein the input shaft bearing includes an inner ring attached to the input shaft and an outer ring fixed to the first support raceway ring.

16. A friction transmission device comprising:
    an input raceway ring;
    a planetary rolling element that is disposed around a rotation axis of the input raceway ring and comes into contact with the input raceway ring;
    an output raceway ring that comes into contact with the planetary rolling element and is connected to an output shaft, the output raceway ring being configured to change a speed of rotation transmitted from the input raceway ring and output the rotation with changed speed; and a first support raceway ring and a second support raceway ring that come into contact with the planetary rolling element;
wherein a quadrangle is formed by extension lines of normal vectors at contact points between the planetary rolling element and the respective raceway rings,
wherein with respect to the planetary rolling element, the input raceway ring is disposed on one side of a radially outer side and a radially inner side, and
wherein the first support raceway ring is disposed on the one side and is rotatable relative to the input raceway ring.

* * * * *